United States Patent
Ritter et al.

(10) Patent No.: US 12,540,820 B2
(45) Date of Patent: Feb. 3, 2026

(54) POSE-DRIVEN POSITION AND NAVIGATION

(71) Applicant: RTX BBN Technologies, Inc., Cambridge, MA (US)

(72) Inventors: Scott E. Ritter, Sudbury, MA (US); Michael J. Nicoletti, Johnston, RI (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 120 days.

(21) Appl. No.: 18/379,546

(22) Filed: Oct. 12, 2023

(65) Prior Publication Data
US 2024/0133692 A1 Apr. 25, 2024
US 2024/0230334 A9 Jul. 11, 2024

Related U.S. Application Data

(60) Provisional application No. 63/418,417, filed on Oct. 21, 2022.

(51) Int. Cl.
*G01C 21/00* (2006.01)

(52) U.S. Cl.
CPC .................. *G01C 21/005* (2013.01)

(58) Field of Classification Search
CPC ..... A61B 5/112; G01C 21/005; G01C 22/006
See application file for complete search history.

(56) References Cited

U.S. PATENT DOCUMENTS

| | | | | |
|---|---|---|---|---|
| 7,602,301 B1* | 10/2009 | Stirling | ............... | A61B 5/11 340/573.7 |
| 9,285,788 B2* | 3/2016 | Nicoletti | ............... | A61B 5/24 |
| 10,182,760 B2 | 1/2019 | Nicoletti et al. | | |
| 11,325,000 B2* | 5/2022 | Shah | ............... | G06F 3/017 |
| 11,398,079 B2 | 7/2022 | Haapoja et al. | | |
| 2011/0166491 A1* | 7/2011 | Sankai | ............... | A41D 13/1281 601/84 |
| 2013/0118255 A1* | 5/2013 | Callsen | ............... | A42B 3/046 73/491 |
| 2013/0123568 A1* | 5/2013 | Hamilton | ............... | A61N 2/02 600/13 |
| 2013/0211594 A1* | 8/2013 | Stephens, Jr. | ............... | B25J 9/1689 700/258 |

(Continued)

OTHER PUBLICATIONS

Navvis, "The Definite Guide to SLAM and Mobile Mapping Technologies," website: https://www.navvis.com/technology/slam, pp. 1-11.

*Primary Examiner* — Tyler J Lee
(74) *Attorney, Agent, or Firm* — CANTOR COLBURN LLP (57) ABSTRACT

Method and body garment for pose-driven determination of a location of a body include: selecting a predetermined location of the body; determining a mode of locomotion of the body as the body moves; inferring the movement of the body and direction of the movement over a time period by combining physiological information of the body with calibration data; calculating a path travelled by the body from the predetermined location; capturing spatial environment of the body and its features, and a current location of the body within the spatial environment, by performing simultaneous localization and mapping (SLAM) on the path travelled by the body; and calculating navigation information of the body without using a location determining device.

16 Claims, 4 Drawing Sheets

(56) References Cited

U.S. PATENT DOCUMENTS

| | | | | |
|---|---|---|---|---|
| 2014/0052567 | A1* | 2/2014 | Bhardwaj | G06Q 30/0631 |
| | | | | 705/26.7 |
| 2015/0088043 | A1* | 3/2015 | Goldfield | A61F 5/01 |
| | | | | 602/6 |
| 2019/0291277 | A1* | 9/2019 | Oleynik | B25J 9/1669 |
| 2020/0097083 | A1* | 3/2020 | Mao | G06F 3/017 |
| 2021/0049652 | A1* | 2/2021 | Brown | A61B 5/4803 |
| 2021/0158630 | A1* | 5/2021 | Muhammad | G06F 3/017 |
| 2022/0308342 | A1* | 9/2022 | Gullicksen | G01S 5/0226 |
| 2023/0072423 | A1* | 3/2023 | Osborn | G16H 20/30 |
| 2024/0127966 | A1* | 4/2024 | Seitz | G16H 50/70 |

* cited by examiner

POSE-DRIVEN POSITION AND NAVIGATION

CROSS-REFERENCE TO RELATED APPLICATIONS

This Patent application claims the benefits of U.S. Provisional Patent Application Ser. No. 63/418,417, filed on Oct. 21, 2022, and entitled "Pose-Driven Position and Navigations," the entire content of which is hereby expressly incorporated by reference.

FIELD

The disclosure generally relates to detection of body movements and pose and more specifically to location determination and navigation using pose and bio-mechanical measurements of an individual.

BACKGROUND

Conventional full body bio-mechanical measurement systems use cameras and/or rigidly affixed sensors and a GPS to get a full body pose picture and the location of the body. However, in some cases GPS or radio frequency (RF) signals may not be available or present and therefore position, location and/or navigation of the body is unduly difficult and inaccurate. None of these methods/systems are compatible with unconstrained (especially indoor) movements and during complex athletic movements by a subject while performing in an unfamiliar environment, for example, during a rescue by a firefighter. Previous and in-service technologies rely on bulky, drift-prone IMU (inertial measurement units, incorporating MEMS accelerometers and gyroscopes) or external video capture mechanisms, typically supplemented with RF signals and GPS.

Full-body biomechanical measurement platforms with high accuracy involve cameras, treadmills, and Inertial Measurement Units (IMUs). However, none of these solutions can isolate and capture the degrees of freedom available from direct physical measurement. IMU-based solutions lack validation; and although gait labs are the "gold standard," running on treadmills is not representative of real-world movement and navigation scenarios. Some IMU-based solutions use Kalman filters to estimate location by omitting data that don't fit the motion model. However, some of these filtered-out data may correspond to minor degrees of freedom, which are useful for navigation purposes.

SUMMARY

In some embodiments, the present disclosure is directed to a method for pose-driven determination of a location of a body. The method includes: selecting a predetermined location of the body; determining a mode of locomotion of the body as the body moves; inferring the movement of the body and direction of the movement over a time period by combining physiological information of the body with calibration data; calculating a path travelled by the body from the predetermined location; capturing spatial environment of the body and its features, and a current location of the body within the spatial environment, by performing simultaneous localization and mapping (SLAM) on the path travelled by the body; and calculating navigation information of the body without using a location determining device.

In some embodiments, the present disclosure is directed to a body garment for pose-driven determination of a location of a body. The body garment includes: a plurality of sensors distributed throughout the garment, each sensor being configured to sense body state information; and one or more processor to select a predetermined location of the body; determine a mode of locomotion of the body as the body moves; infer the movement of the body and direction of the movement over a time period by combining physiological information of the body with calibration data; calculate a path travelled by the body from the predetermined location; capture spatial environment of the body and its features, and a current location of the body within the spatial environment, by performing simultaneous localization and mapping (SLAM) on the path travelled by the body; and calculate navigation information of the body without using a location determining device

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

DETAIL DESCRIPTION

In some embodiments, the present disclosure is directed to a method for location determination and navigation of a body, using pose and bio-mechanical measurements of the body. The method performs simultaneous localization and mapping (SLAM) using pose, bio-mechanical measurements with low-power, unobtrusive, wearable technology and without requiring any RF signal, GPS device or other location determining devices. In some embodiments, the approach captures a location of a body and the body's movement path within an area, without using beacons or cumbersome mobile devices or systems with GPS capability. In some embodiments, the present disclosure captures the map of a space and location of a body within it, without using beacons or cumbersome mobile devices, including robots, RF and GPS devices. "Body" as used herein refers to the body of a human being or an animal, or the body of an object, such as a robot or portions thereof.

In some embodiments, the present disclosure is a conformal garment, e.g., pants, jacket, vest, or leotard, that includes 1) integrated strain sensors to detect body pose, 2) a mechanism for capturing sensed pose vs. time data, 3) a mechanism for recording the sensed data, and 4) a processor and storage medium with software to convert the sensed data into a sequence of body translations and reorientations from which a history of locations that the body has travelled within an explored volume (i.e., tour of a building) can be computed (i.e., SLAM). The processor component may be located and be activated apart from the garment; and be used at any time during or after data capture.

The present disclosure takes data from the sensors, camera(s) and compasses to characterize the repeatability, sensitivity, and a unique mapping from sensor output to body position, determine the body pose, gaits, speed, orientation and direction, and provide navigation data for the body based on this data. The approach is also capable of determining and incorporating data indicating muscle activation, sensitivity to off-axis motion, and manifold reconstruction.

Figure 1:
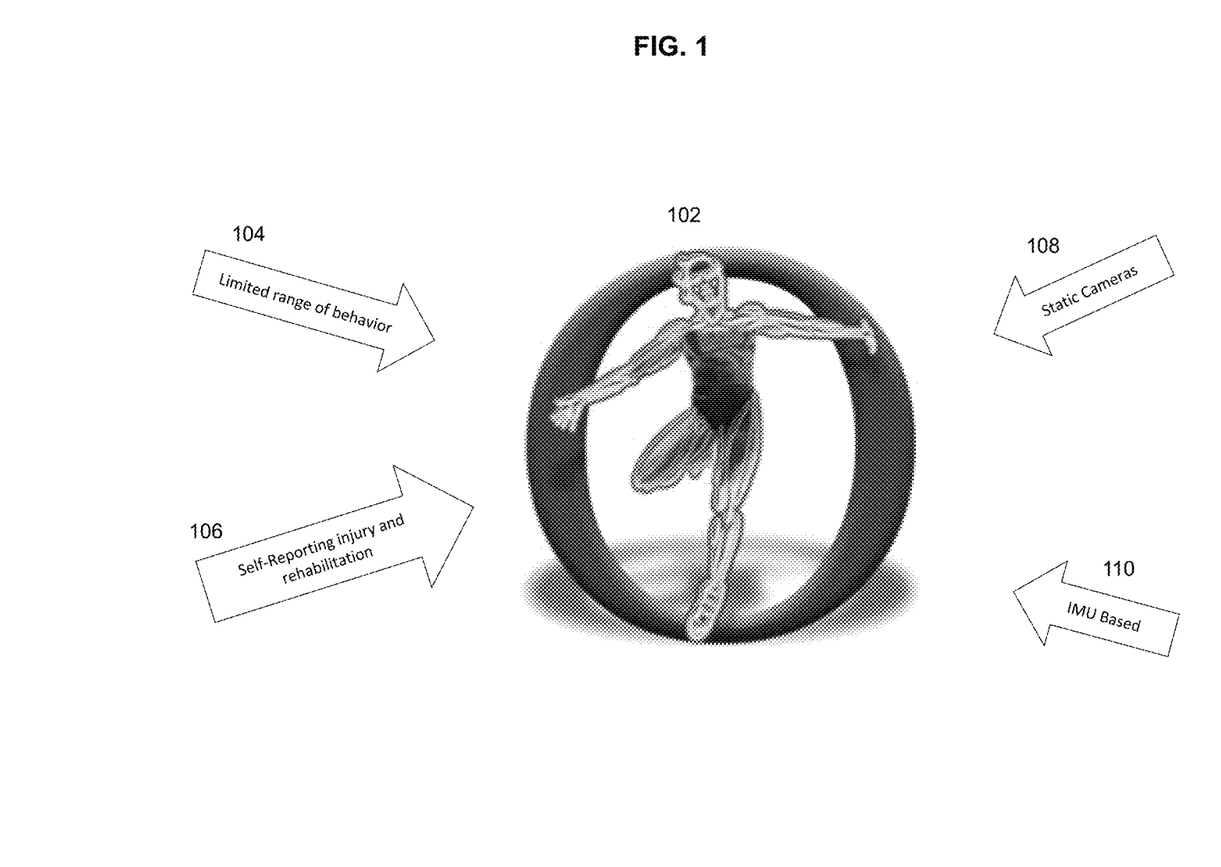
FIG. 1 illustrates an example of various inputs to a biomechanical simulator system for detection of body movements and pose and navigating the body using the pose and bio-mechanical measurements of an individual, according to some embodiments of the disclosure.

FIG. 1 illustrates an example of various inputs to a biomechanical simulator system for detection of body movements and pose and providing navigation data for the body using the pose and bio-mechanical measurements of a body 102, according to some embodiments of the disclosure. As shown, various inputs to the system include limited range of behavior 104 of the body 102, self-reporting injuries and rehabilitation 106, optional cameras input 108 and optional IMU based inputs 110. The person/object 102 may be a human being, an animal, such as a dog, or a robot. The limited range of behavior 104 inputs are generated by a plurality of sensors (not shown), some of which are affixed to a smart garment worn by the person 102. The method performs simultaneous localization and mapping (SLAM) using some or all of these inputs for location determination and navigation of the body, without requiring any RF signal, GPS device or other location determining devices.

In some embodiments, the plurality of sensors may form one or more meshes placed throughout, for example, a leg to detect body (in this case, leg) pose and muscle activation. For example, one or more sensors in the upper area of the knee sense and generate related data for elongation in circumferential direction with muscle expansions. Likewise, one or more sensors around the knee sense and generate related data for elongation in front and compression in the back of the knee, during knee flex. Pressure sensors at the foot area, for example, at the side and bottom of the foot, sense the pressure exerted on the foot and generate related data.

In a calibration process, which may take place as an initialization step or continuously during operation, self-reporting injuries and rehabilitation inputs 106 affect the analysis of the sensor data with respect to a particular person. For example, if the person has had a knee injury that would limit the movement of his/her knee, the sensor data may be adjusted for the injury by giving some sensor data a different weight, for instance. Static cameras input 108 is generated by a plurality of cameras positioned at different angles to capture the movement of the body. Similarly, if a robot had some calibration offset, the sensor data may be adjusted for the offset. The optional IMU inputs may be generated by one or more inertial measurement units. The present approach allows for determination of the body location and movements that leads to a model of instantaneous body location and movement, and muscle activation measurements that can be saved or ex-filtrated to off-board components.

This data may then be used to distinguish high-dimensional goal manifolds or modes, e.g., the gait of the subject, walking, jogging, running, climbing, crawling and/or swimming modes. In addition to determination of the location of and navigation information for the body, the data may also be used to analyze the subject's mechanical repeatability or efficiency of a goal, asymmetrical behavior in completion of a goal or metabolic load; using unique processing techniques specific to each feature. The data from the sensors may also be utilized to detect fitness, injury/malfunction, fatigue, changes due to different weight bearing loads and health of both the subject and the garment. This data can also be used to control a variety of mechanical or robotics actuators, such as a mechanical assist for walking/running or the seamless integration of a prosthetic limb.

Using the SLAM technology serves remote applications where human passage is awkward or technical operations are acceptable. Some exemplary applications of SLAM technology are self-navigating vehicles including cars, lawnmowers, and drones; and exploration of manmade and natural structures including caves, mines, buildings, reefs, and vasculature.

In some embodiments, the present disclosure is directed to a smart garment and a method thereof for detection of body kinematics and physical states, determination of the location of the body and assistance in navigation of the body. The smart garment incorporates many sensors and a direction/orientation device (e.g., a compass) affixed to the suit. The garment optimally uses data from the sensors and the compass to derive body state information, such as pose, motion and muscle activation and use the information to assist navigation of the body. The garment is capable of collecting and processing data in real time for control of a variety of applications that require pose, activation or movement as inputs and navigation without availability of any GPS or RF device. Examples of such applications include actuator interfaces for mechanical assisting, robots, haptic feedback devices for delivering injury warnings, biomechanical systems designed to analyze metabolic activity or athletic load endured by the subject, prosthetic limbs and assistance devices, and health monitoring systems.

In some embodiments, the garment includes a plurality of sensors distributed throughout the garment, each sensor being configured to sense body state information from a local surface area of a body part covered by the garment; a plurality of sensor nodes in proximity to the plurality of sensors respectively, each sensor node including a processor and storage device and configured to receive sensing body state information from at least one of the plurality of sensors, and one or more orientation devices, such as compass to obtain a direction of the body movement.

Figure 2:
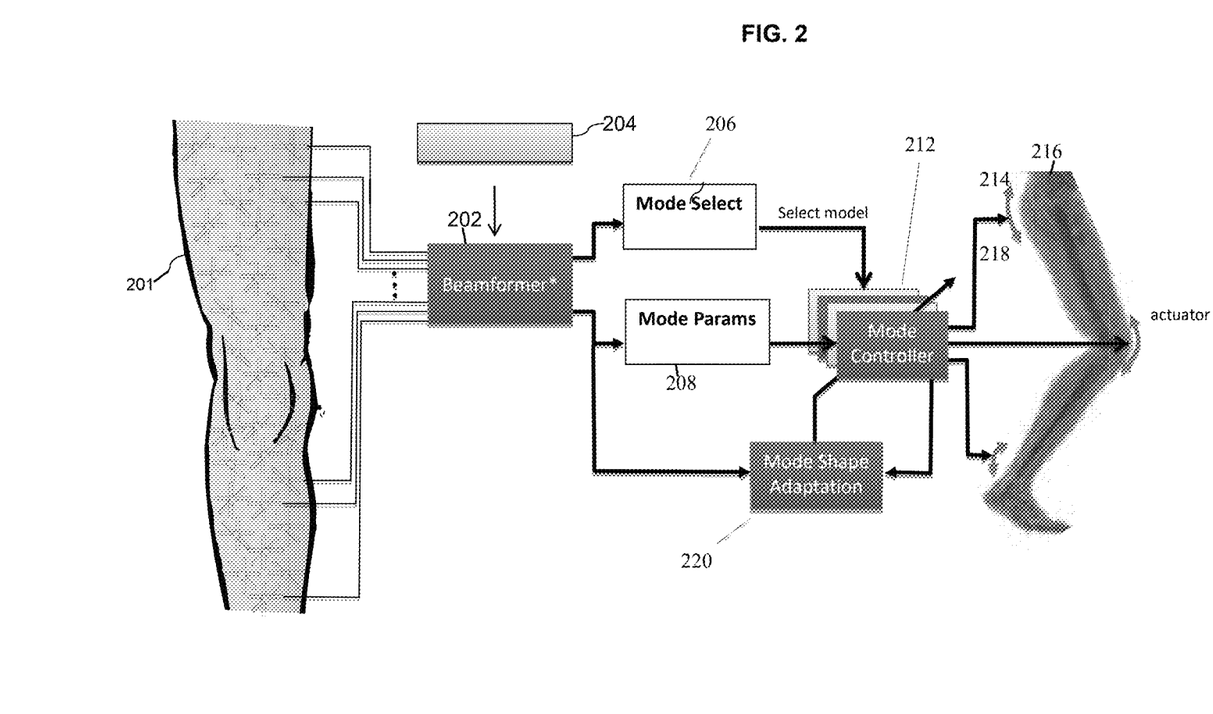
FIG. 2 shows a simplified exemplary block diagram for a control function, according to some embodiments of the present invention.

FIG. 2 shows a simplified exemplary block diagram for a control function, according to some embodiments of the present invention. A garment 201 with distributed sensors and processors provides localized information about a portion of the body, for example, the leg in this case. This information is processed by a beamformer 202 that serves several functions. For instance, the beamformer 202 provides a scoring mechanism against basis functions 204 that are characteristic to the different capabilities of the garment or a larger set of garments. These basis functions may include processed metrics, such as, cycle time and higher frequency muscle motion (e.g., impact vibrations) to produce key features that are used in a weighted multiple evidence comparison scheme, such as, the Dempster-Shafer method.

In some embodiments, features may also be a manifold comparison using an inner product of measured distribution versus candidate manifold shapes. For example, a heavy lifting motion will have certain muscles all activated in phase, a high level of detected effort, and slow movement time. A simple standing action would have a lower level of effort and a running action would have different phasing of the muscles and a different motion speed. In a Dempster-Shafer process, each candidate action would have a statistical likelihood of a feature value being associated with the action. Continuing with the heavy lift example, consider the three candidate features of high muscle activation, phase (synchronization) of muscle activation and action speed. From a probability perspective, a weighted statistical algorithm could assign a weighted probability of 1 for a slow action speed for heavy lift and standing actions but only a 0.1 for a running action.

Table 1 shows an example of how such features could be used to score measured information against candidate actions for this simple example. The result then scores a heavy lift as the most probable action being performed. Additional features would improve discrimination among the actions, for instance, preceding activation states or modes, or map location.

TABLE 1

| Example Measured Feature | | Example Basis Function Score | | |
|---|---|---|---|---|
| Description | Value | Heavy Lift | Standing | Running |
| Muscle activation intensity | High | 1 | .3 | 1 |
| Activation phase | In-phase | 1 | 1 | 0.3 |
| Action Speed | slow | 1 | 0.9 | 0.1 |
| Simple Total | | 3 | 2.2 | 1.4 |

This enables the larger control system to select a particular mode 206 (e.g., running) and parameters 208 associated with that mode (e.g., gait). The beamformer 202 also provides information for mode shape adaptation 220, or tuning. The mode selector 206 chooses which dynamic mode controller 212 to employ to optimize the estimated action. This controller issues distributed actuation commands to notional actuation mechanisms 214, 216 and 218.

In some embodiments, the feedback components of FIGS. 1 and 2 may be used to check the body's movements and enable subsequent movements to be coordinated such that the fidelity of the process is improved. For example, if a body's uneven gaits were proving difficult to process, then a feedback mechanism might help the body to move more consistently.

A detailed description of a smart garment/suit and a method for detection of body kinematics and physical state is provided in U.S. Pat. No. 9,285,788, entitled "Smart Garment and Method for Detection of Body Kinematics and Physical State," the entire contents of which is expressly incorporated by reference herein.

Figure 3:
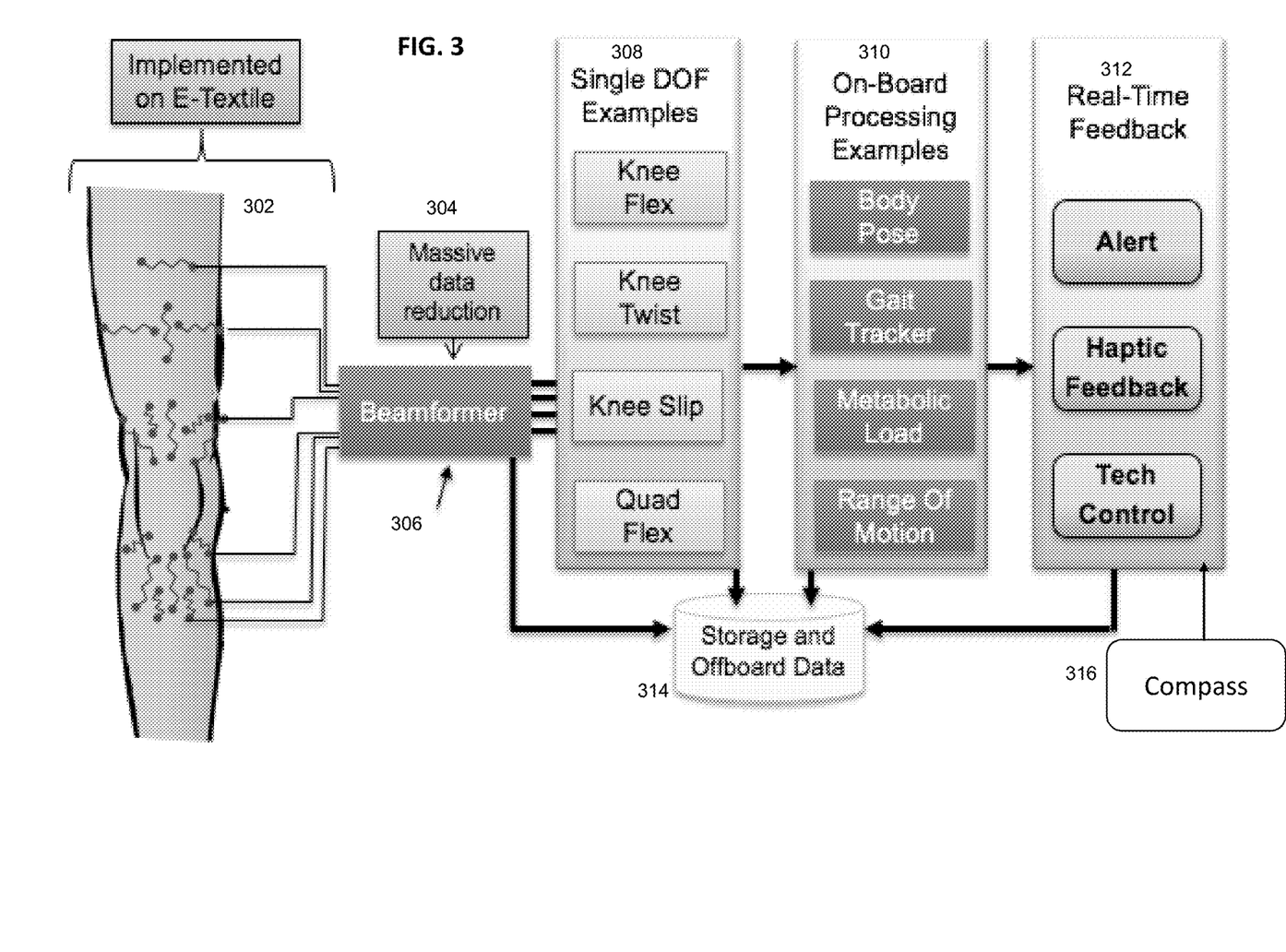
FIG. 3 shows a simplified exemplary block diagram for a control function for navigation, according to some embodiments of the present disclosure.

FIG. 3 shows a simplified exemplary block diagram for a control function for navigation of a body, according to some embodiments of the present disclosure. In some embodiments, the sensor inputs are mathematically transformed into a parametric model of pose or gait that yields a significant data reduction 304. Since there are many sensors (302) providing a significant amount of sensing data, the computed activity is parameterized into a relatively small number of variables for a single degree of freedom (DOF) for the angle of knee flexure 308. For example, knee flex, knee twist, knee slip and quad flex are parametrized. These in turn are processed by one or more processors 310 to determine higher-order pose or activity modes, such as walking or running gaits and velocities. The one or more processors may include various modules for calculating body pose, gait tacking, metabolic load and range of motions. In some embodiments, the system provides real-time feedback data 312, which may be used to guide the subsequent activities of the body for improved SLAM fidelity.

A compass 316 provides directional input that is utilized for determining the movement of and navigation information for the body using the information from the one or more processors 310.

Figure 4:
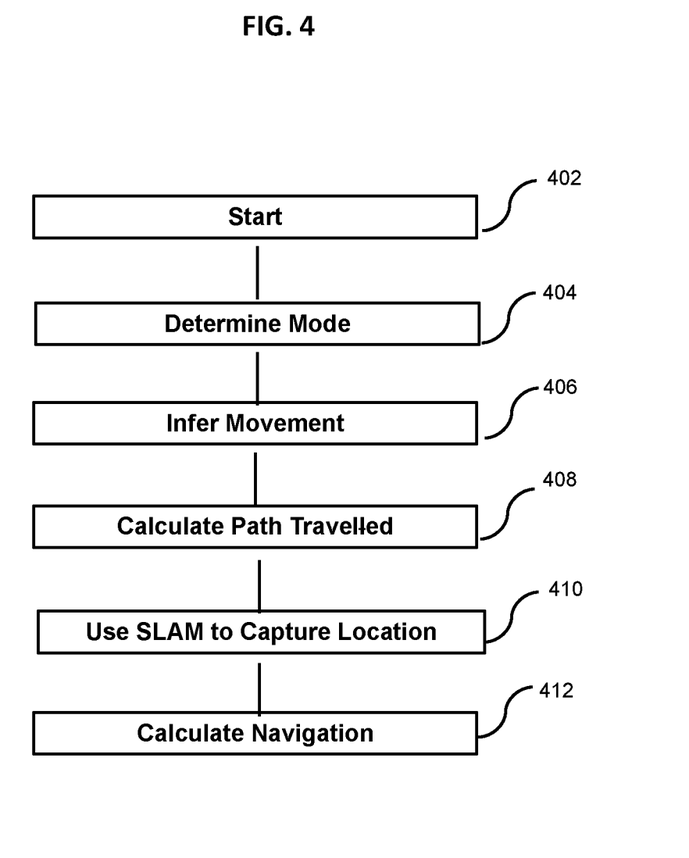
FIG. 4 illustrates a simplified exemplary flow diagram, according to some embodiments of the present disclosure.

FIG. 4 illustrates a simplified exemplary flow diagram, according to some embodiments of the present disclosure. As shown in block 402, the process starts from a known location. Also, reference location can be determined at any point and then propagated backward through the body's motion history to map out earlier locations. For example, if the body's location is known at any time in an environment, the pose and mode data that have been collected since when collection first began can be utilized to calculate the body's location at any previous time. In some embodiments, this calculation is performed by considering the prior activities of the body in reverse, i.e., by calculating the path traveled backwards. In block 404, mode of locomotion is determined, as explained above. For instance, the process identifies whether the body is stepping, walking, running, crawling, moving up or down a stair, moving uphill or downhill, or other types of locomotion the body.

In block 406, the physiological information, such as motions and exertions of the body (captured by the sensors), is combined with calibration data that infers the movement of the body, that is, how much the body moved over time with respect to the direction/orientation information from a compass, radio transmitter, or other direction finding devices. In some embodiments, an initialization or continuous calibration process determines the mapping between physiological activity and sensor activations. For example, an initialization calibration process might entail the body to assume a small number of reference poses, e.g., arms out to each side, so that the signal levels from garment sensors near the elbows and shoulders can be measured and henceforth known to correlate with that pose.

The physiological data (determined from the sensors and calibration) and a starting location or orientation (e.g., from the compass, GPS, known map starting point, etc.) are utilized to determine the changes in location and orientation of the body (i.e., movement) relative to that point, in block 406. The path (408) of the body through the spatial environment (map) and, simultaneously, the location of the body within the spatial environment relative to the path are then determined, in block 410.

In some embodiments, a pressure sensor or altimeter device can be utilized to help define moving up or down stairs. Moreover, an accelerometer may be used to disambiguate orientation (e.g., crawling vs. climbing a ladder) by sensing the body's orientation in the gravitational field.

In block 408, the movement direction of the body is combined with the synchronized estimates of locomotion to calculate a path travelled by the body. In some embodiments, the system leverages other onboard sensors wherever possible to discipline the system. For example, if GPS data are occasionally available, then the GPS reported locations can be used to make small corrections to the computational parameters of or outputs from all blocks that contribute to estimating location in the absence of GPS. This improves the accuracy of the invention during subsequent GPS outages In block 410, the system uses this data (in one of the several known algorithmic implementations to perform simultaneous localization and mapping (SLAM) to capture a location of the body and the body's movement path within an area without using beacons or GPS devices. Although, the approach requires no information about the area, any available information may be used to improve fidelity. For example, if it is known that there is a ladder within the immediate vicinity of the body and sensors indicate muscle exertion, then a climbing or descending mode may be determined with high confidence. In some cases, the geographical range of the movements within an unknown volume of space reveal a map of the passageways (doorways, hallways, etc.) through that space. As the map is revealed, the body's location on that map is inherently determined as well. For example, as it is determined that the body is descending a stairwell at the end of a hallway, then the spatial relationship between the hallway and stairwell and the location of the wearer on the stairwell can all be determined as well.

As known in the art, SLAM algorithms construct or update a map of an unknown environment while simultaneously keeping track of a body's location in the map. There are several algorithms that perform this, for example, particle filter, extended Kalman filter, covariance intersection, and GraphSLAM. The process provides the SLAM algorithm with the magnitude of motion based upon sensor input, and uses information such as "walking upstairs" to add additional precision. In some embodiments, when interior features are unknown (as opposed to the "ladder" example, above), the approach can improve the fidelity of the derived map by recognizing not only that the wearer had moved forward in an unknown space, but also that they have encountered an ascending or descending group of stairs.

In block 412, the process outputs localization information for GPS-denied settings. For example, after reviewing the map and the path taken by the body, the process can determine that the body navigated from a first location to a second location, even though its path was more complex and revealed additional details about its environment.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for pose-driven determination of a predetermined location of a body of a person, with a physiological activity sensing and processing system, the method comprising:
    receiving, by a controller of the system, sensor data from sensors embedded in a garment of the system, wherein the garment is worn by the person, wherein the garment is one or more of pants, jacket, vest, or leotard;
    receiving, by the controller, input indicative of the predetermined location of the body where the garment is worn;
    determining, by the controller from the sensor data, a mode of locomotion of the body as the body moves;
    inferring, by the controller, the movement of the body and direction of the movement over a time period by combining physiological information of the body with calibration data;
    calculating, by the controller, a path travelled by the body from the predetermined location;
    capturing, by the controller, spatial environment of the body and its features, and a current location of the body within the spatial environment, by performing simultaneous localization and mapping (SLAM) on the path travelled by the body;
    calculating, by the controller, navigation information of the body without using a location determining device; and
    determining, by the controller, that a movement state of the body is uncoordinated,
    providing, by the system, feedback to the person whereby the movement state of the body is coordinated, thereby enabling location computation.

2. The method of claim 1, wherein the calibration data account for injuries, repairs or offsets to the body.

3. The method of claim 1, wherein the physiological information includes motions and exertions of the body.

4. The method of claim 1, wherein the mode of locomotion of the body includes one or more of gait, walking, jogging, running, climbing, and swimming.

5. The method of claim 1, further comprising capturing a map of a space and location of the body within it, without using beacons or mobile devices.

6. The method of claim 1, further comprising computing a history of locations that the body has travelled by converting sensor data into a sequence of body translations and reorientations.

7. The method of claim 1, further comprising continuously performing a calibration process.

8. The method of claim 1, further comprising utilizing pose and mode data to calculate a location of the body at a previous time.

9. A physiological activity sensing and processing system, comprising:
    a controller;
    a body garment for pose-driven determination of a location of a body, wherein the body garment is one or more of pants, jacket, vest, or leotard;
    a plurality of sensors distributed throughout the garment, each sensor being configured to sense body state information as sensor data and transmit sensor data to the controller; and
    wherein the controller is configured to:
    receive data indicative of a predetermined location of the body where the garment is located;
    determine, from the sensor data, a mode of locomotion of the body as the body moves;
    infer the movement of the body and direction of the movement over a time period by combining physiological information of the body with calibration data;
    calculate a path travelled by the body from the predetermined location;
    capture spatial environment of the body and its features, and a current location of the body within the spatial environment, by performing simultaneous localization and mapping (SLAM) on the path travelled by the body;
    calculate navigation information of the body without using a location determining device, and
    determine that a movement state of the body is uncoordinated,
    wherein, upon determining that a movement state of the body is uncoordinated, the system is configured to provide feedback to the person, whereby the movement state of the body is coordinated, thereby enabling location computation.

10. The body garment of claim 9, wherein the calibration data account for injuries, repairs or offsets to the body.

11. The body garment of claim 9, wherein the physiological information includes motions and exertions of the body.

12. The body garment of claim 9, wherein the mode of locomotion of the body includes one or more of gait, walking, jogging, running, climbing, crawling and swimming.

13. The body garment of claim 9, wherein the one or more processors further capture a map of a space and location of the body within it, without using beacons or mobile devices.

14. The body garment of claim 9, wherein the one or more processors further compute a history of locations that the body has travelled by converting sensor data into a sequence of body translations and reorientations.

15. The body garment of claim 9, wherein the one or more processors continuously perform a calibration process.

16. The body garment of claim 9, wherein the one or more processors utilize pose and mode data to calculate a location of the body at a previous time.

* * * * *